United States Patent [19]
Wilson et al.

[11] 3,859,523
[45] Jan. 7, 1975

[54] HIGH TEMPERATURE WELL LOGGING INSTRUMENT HAVING INCREASED UTILIZATION OF DEWAR FLASKS

[75] Inventors: Billy F. Wilson; William H. Spidell, both of Houston, Tex.

[73] Assignee: Dresser Industries, Inc., Dallas, Tex.

[22] Filed: Jan. 26, 1973

[21] Appl. No.: 326,649

[52] U.S. Cl................................ 250/261, 250/253
[51] Int. Cl............................................. G01v 5/00
[58] Field of Search ............ 250/253, 261, 269, 270

[56] References Cited
UNITED STATES PATENTS

| | | | |
|---|---|---|---|
| 2,433,554 | 12/1947 | Herzog................................ | 250/261 |
| 3,049,620 | 8/1962 | George et al. ....................... | 250/261 |
| 3,254,217 | 5/1966 | Youmans............................. | 250/261 |
| 3,265,893 | 8/1966 | Rabson et al. ....................... | 250/261 |

Primary Examiner—Archie Borchelt
Attorney, Agent, or Firm—William E. Johnson, Jr.

[57] ABSTRACT

Three modular components of a well logging instrument are illustrated for use in 500° F. wells. Each modular component utilizes a Dewar flask and a heat sink chosen specifically for the respective internal component. One modular component utilizes a Geiger-Müller counter with a heat sink comprised of a eutectic alloy having a eutectic temperature of 281° F. A second modular component utilizes a scintillation counter and a heat sink having a eutectic temperature of 158° F. A third modular component utilizes an electronics section and a heat sink having a eutectic temperature of 281° F. To enable the modular components to be utilized in a single well logging instrument, the volumes of the heat sinks are adjusted as by increasing the volume of heat sink material having the lower eutectic temperature.

6 Claims, 4 Drawing Figures

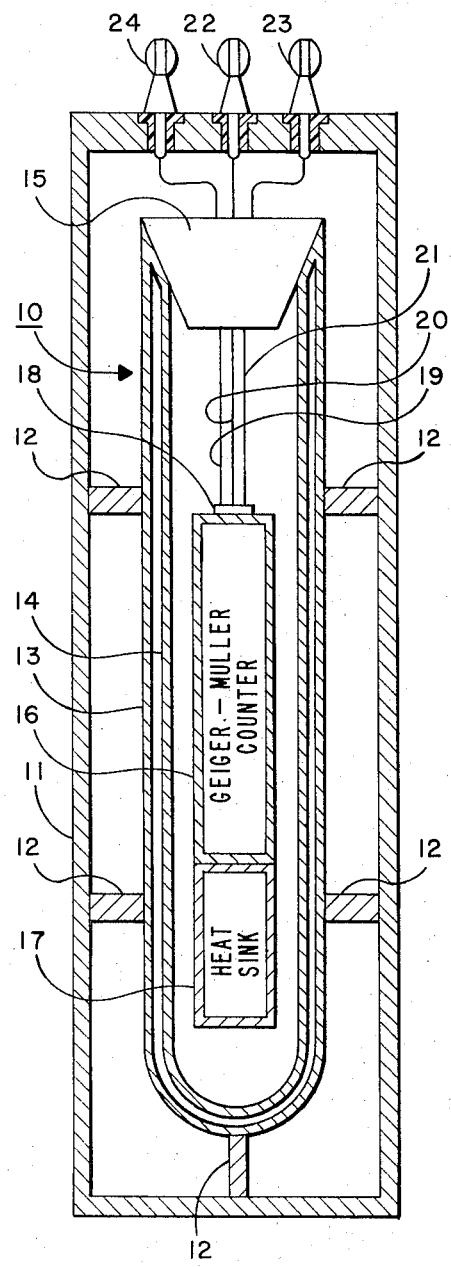
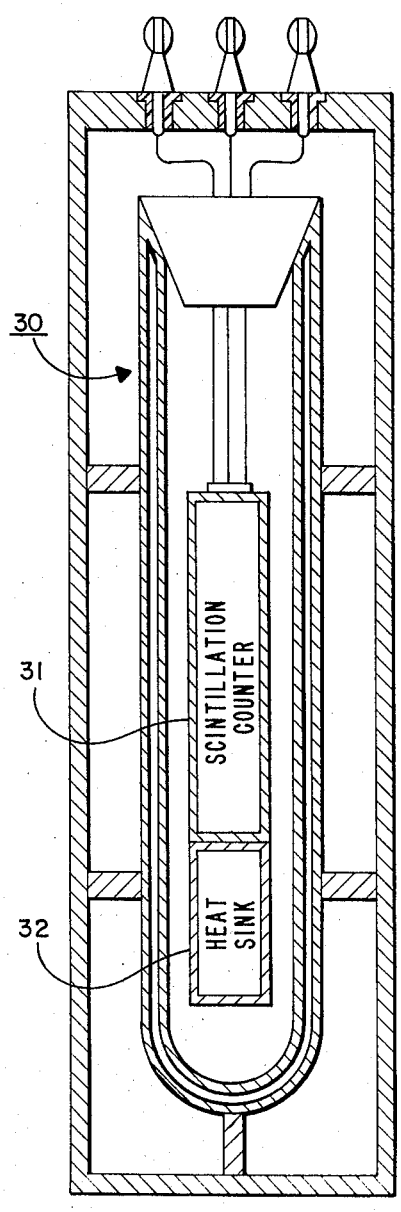

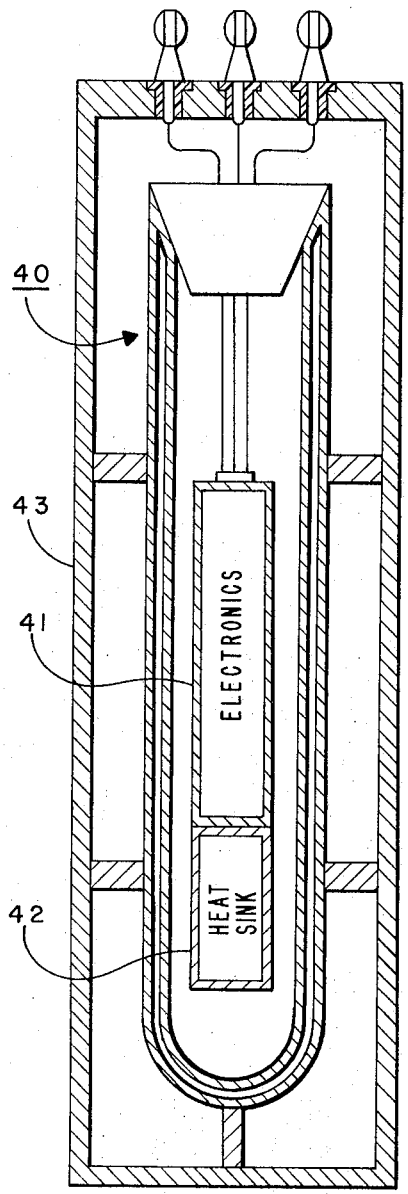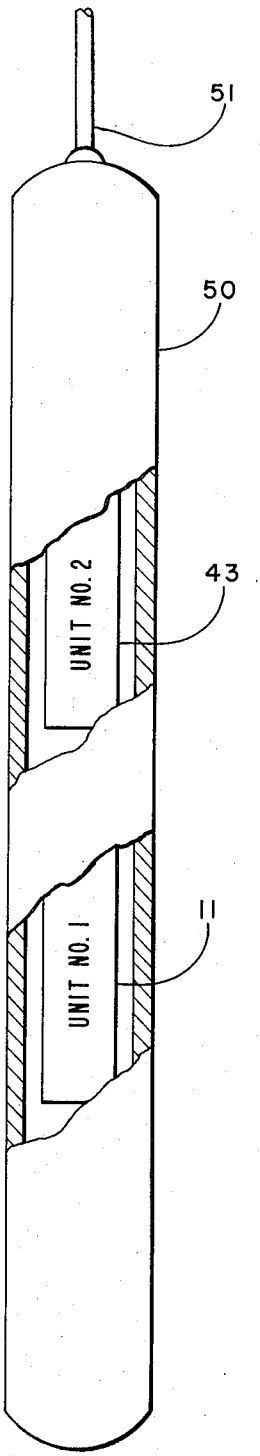

HIGH TEMPERATURE WELL LOGGING INSTRUMENT HAVING INCREASED UTILIZATION OF DEWAR FLASKS

BACKGROUND OF THE INVENTION

This invention relates in general to temperature stabilization of well logging instruments, and in particular, to temperature stabilization of well logging devices employing modular construction to provide interchangeability among the various components of such systems.

It is well known in the prior art to provide temperature stabilization of a given component of a well logging unit to thereby enable operation of the unit in a very hot well. Examples of such prior art systems include U.S. Pat. No. 3,265,893 to T. A. Rabson et al, assigned to the assignee of the present invention and U.S. Pat. No. 3,038,074 to S. A. Scherbatskoy. However, the prior art is exemplified by the use of a Dewar flask for containing 3,038,074 radiation detector which frequently is unable to operate except at temperatures well below the borehole temperature of the well being logged. By way of example, the aforementioned Scherbatskoy patent speaks of logging wells in the neighborhood of 375° F. while maintaining the radiation detector section in the neighborhood of 100° F. In a similar manner, the aforementioned Rabson et al patent teaches the use of apparatus providing similar temperature gradients. However, the prior art within our knowledge attempts to stabilize the temperature of the radiation detector sections without regard to the provision of temperature stabilization for the associated electronic circuitry. These schemes have proved adequate in the temperature ranges up to about 375° F. However, with the present state of the art of drilling wells achieving greater and greater depths, it is now realized that the borehole temperature at such depths frequently is in the neighborhood of 500° F., despite the fact that present state of the art electronic components derate to zero power rating at about 400° F.

As with any of the prior art devices using a Dewar flask to provide temperature stabilization, the well logging instrument is lowered into the well and as the ambient temperature surrounding the instrument increases, heat gradually leaks into the zone within the insulated jacket in the Dewar flask and the temperature within that zone increases rather rapidly until the temperature is reached at which the change of state commences to occur. Thus, for example, a temperature sensitive material may be chosen which melts at a temperature in the range of 150° F. Once such melting or other change of state has commenced, the temperature within the insulated zone does not increase appreciably until sufficient heat has been absorbed to melt or otherwise alter the state of nearly all the temperature sensitive material. With good heat insulation and the proper choice of the quantity of temperature sensitive materials, the melting of the heat sink material will not be completed for several hours despite the outside temperature in the borehole being in the neighborhood of 300–500° F. With such devices, the instrumentation carried within the flask is held at a moderate and substantially constant temperature until such time as the heat sink material has thoroughly melted.

Because of the out-gassing and other somewhat strenuous measures required in using such a Dewar flask, it is generally desirable to maintain the contents of the flask in a given condition once the flask is assembled. For example, it is undesirable to perform any modification, addition or removal of components within the Dewar flask once the assembly job is completed.

It is therefore the primary object of the present invention to provide additional utilization of the various modular components used in the well logging of very hot wells;

It is yet another object of the present invention to provide increased efficiency of the apparatus used in providing temperature stabilization of the various modular components of well logging instruments used in logging very hot wells; and It is yet another object of the present invention to provide new and improved well logging instruments for use in logging very hot wells.

The objects of the invention are accomplished, generally, by a well logging instrument having modular construction wherein the various components within the instruments are individually housed in their respective Dewar flasks. As an additional feature of the invention, the individual modular components utilize different heat sink materials to improve the efficiency of the overall system. These and other objects, features and advantages of the present invention will be more readily appreciated from a reading of the following detailed specification and drawing, in which:

FIG. 1 is a diagrammatic view, partly in cross section, of one of the modular components of the system according to the present invention;

FIG. 2 is a diagrammatic view, partly in cross section, of an additional modular component of the system according to the present invention;

FIG. 3 is a diagrammatic view, partly in cross section, of a third modular component of the system according to the present invention; and FIG. 4 is a diagrammatic view, partly in cross section, illustrating the use of the modular components illustrated in FIG.'s 1–3. Referring now to the drawing in more detail, especially to FIG. 1, there is illustrated a Dewar flask 10 which is suspended within a box-like housing 11 by means of a plurality of springs 12. The Dewar flask itself is conventional and has spaced apart double-walls 13 and 14 and an end stopper 15 as is known in the art. A conventional Geiger-Müller counter 16 is located in the interior space of the flask 10 as is a heat sink 17, such space being at least partially evacuated. The electrical outputs and associated electrical wiring are connected from a plug 18 by means of conductors 19, 20 and 21 which pass through the end stopper 15 to the respective electrical plugs 24, 22 and 23. It should be appreciated that the number of electrical connections is for illustrative purposes only and can be any number desired depending upon the type of counter, radiation detector or other well logging element embodied within the interior of the Dewar flask 10.

The heat sink material used within the Dewar flask 10 is a eutectic alloy of bismuth and tin that melts at a temperature of 281° F. Such an alloy is comprised of 58 percent bismuth and 42 percent tin. With a high quality stainless steel vacuum flask and approximately 12 pounds of this particular heat sink material, we have found that the unit will provide approximately 10 hours of operating time at 281° F. while operating in a borehole having a temperature of 500° F.

FIG. 2 illustrates a similar Dewar flask 30 as was illustrated in FIG. 1 but having a scintillation counter 31 used therein which is generally unable to operate at the higher temperatures used with the Dewar flask 10. We have found, however, that by using a different type of eutectic alloy for the heat sink 32, we can maintain the scintillation counter 31 at approximately 158° F. and prevent damage to the counter. The particular heat sink 32 used with the scintillation counter 31 is one which is comprised of 50 percent bismuth, 13.3 percent tin, 26.7 percent lead and 10 percent cadmium, such heat sinks having a eutectic temperature of 158 percent F. It should be appreciated that additional heat sink material is required when operating at a lower eutectic temperature. Thus, instead of using 12 pounds as was used in the heat sink 17 of FIG. 1, it is necessary to use a considerably higher volume than that for the heat sink 32 to enable the units embodied in FIG.'s 1 and 2 to be run for the same length of time in a given borehole. By way of example, one can use approximately twice that which was used in the heat sink 17 for the heat sink 32, e.g., 28 –30 pounds.

Referring now to FIG. 3, there is illustrated a third Dewar flask 40 having the electronics section 41 therein and a heat sink 42. Since most electronic components can be safely used at temperatures in the neighborhood of 281° F., the heat sink 42 is identical with the heat sink 17 utilized in FIG. 1. Those skilled in the art will recognize, however, that the heat sink material and volume of material required can be altered to suit the needs of the individual electronic circuits. The electronics used within a given one of the Dewar flasks can be any one or more of the electronic circuits well known in the well logging art. However, it should be appreciated that when we speak of electronic circuitry for conditioning the signals from a well logging element, we contemplate such diverse functions as amplifying, gating, modifying, digitizing or otherwise conditioning such signals.

Referring now to FIG. 4, there is illustrated a well logging instrument 50 having a logging cable 51 attached thereto which is used for hoisting and lowering the well logging instrument 50 within an earth borehole and has the necessary electrical conductors therein for providing electrical power from the earth's surface to the well logging instrument and for transmitting the electrical information obtained from the instrumentation within the instrument 50 back to the earth's surface.

Embodied within the well logging instrument 50 are a pair of modular units identified as Unit No. 1 and Unit No. 2. The modular components are illustrated as being only two in number but can be any number as desired. For example, the Unit No. 1 can correspond to the housing 11 and the associated apparatus illustrated in FIG 1 and the Unit No. 2 can be the housing 43 and its associated apparatus illustrated in FIG. 3. Thus, one is able to take the instrument as illustrated in FIG. 4 and conduct a radioactive well survey utilizing a Geiger-Müller counter in a Unit No. 1 and the necessary electronics in the Unit No. 2. If one desires then to conduct a radioactive well logging survey utilizing a scintillation counter, the modular unit illustrated in FIG. 2 can be substituted for the Unit No. 1 and still use the same electronics section as illustrated and identified as being Unit No. 2, since for the most part, the electronics which is used with the Geiger-Müller counter can be interchanged with the electronics used with the scintillation counter.

Thus, it should be appreciated that there has been illustrated and described herein the preferred embodiments of the present invention, such embodiments having obvious advantages and improvements over the prior art in providing vastly increased efficiency and expanded utilization of temperature stabilization techniques in well logging services involving very hot wells. Also it should be appreciated that by utilizing different types of heat sinks within the modular components, there is a vastly improved efficiency of the modular components which are utilized since it is then unnecessary to maintain all of the individual components at the temperature of the unit having the least temperature tolerance, e.g., a scintillation counter. Although the preferred embodiments have been illustrated and described herein, other modifications and arrangements will be obvious to those skilled in the art from a careful reading of the foregoing specification. For example, while the overall system illustrated in FIG. 4 contemplates only the use of a pair of the modular components, quite obviously, one is able to conduct well logging surveys utilizing all three of the modular components illustrated in FIG.'s 1-3 in the same well logging instrument if desired. Furthermore, although the well logging elements in FIG.'s 1 and 2 are associated with radioactivity well logging services, the well logging elements can also be such units as are used with acoustic, inductive and resistivity well logging services as well. For example, in providing an acoustic service, the acoustic receivers and transmitters can be placed in one or more Dewar flasks. It should also be appreciated that while only the Dewar flask in FIG. 1 is described in any great detail, the flasks and associated housings illustrated in FIG.'s 1-3 are substantially identical aside from the heat sinks and well logging elements embodied therein.

The embodiments of the invention in which an exclusive property or privilege is claimed are defined as follows:

1. A well logging apparatus for logging very hot wells, comprising:
   an elongated housing adapted to traverse said wells;
   a first double-walled enclosure in said housing defining a first sealed-off space interior to the walls of said first enclosure, said first space being at least partially evacuated;
   a first mass of material in said first space having a given heat sink capability;
   a first well logging element in said first space for producing signals representative of a physical condition in said well;
   a second double-walled enclosure in said housing defining a second sealed-off space interior to the walls of said second enclosure, said second space being at least partially evacuated;
   a second mass of material in said second space having a given heat sink capability; and
   electronic circuitry in said second space electrically connected to said first well logging element for conditioning said signals for transmission to the earth's surface.

2. The apparatus according to claim 1 wherein said given heat sink capability of said first mass is equal to said given heat sink capability of said second mass.

3. The apparatus according to claim 1 wherein said given heat sink capability of said first mass is different from said given heat sink capability of said second mass.

4. The apparatus according to claim 1 wherein said first well logging unit comprises a scintillation counter.

5. The apparatus according to claim 1 wherein said first well logging unit comprises a Geiger-Muller counter.

6. In a method for logging very hot wells wherein first and second Dewar flasks are used within a well logging instrument wherein a first well logging element having a first given maximum operating temperature is placed in said first flask and a second well logging element having a second given maximum operating temperature different from said first maximum operating temperature is placed in said second flask, the improvement comprising the step of using a first sink material in said first flask and a second heat sink material different from said first heat sink material in said second flask.

* * * * *